(12) United States Patent
Hays et al.

(10) Patent No.: US 11,087,244 B2
(45) Date of Patent: Aug. 10, 2021

(54) SYSTEM AND METHOD FOR AGGREGATING AND UPDATING HETEROGENEOUS DATA OBJECTS

(71) Applicant: AMADEUS S.A.S., Biot (FR)

(72) Inventors: Jean-Chafic Hays, Nice (FR); Federica Spiriti, Antibes (FR); Catherine Bignotti, Antibes (FR); Ludovic Vouriot, Vallauris (FR)

(73) Assignee: AMADEUS S.A.S., Biot (FR)

( * ) Notice: Subject to any disclaimer, the term of this patent is extended or adjusted under 35 U.S.C. 154(b) by 0 days.

(21) Appl. No.: 16/883,185

(22) Filed: May 26, 2020

(65) Prior Publication Data
US 2020/0379971 A1 Dec. 3, 2020

(30) Foreign Application Priority Data

May 29, 2019 (FR) .................................. 1905718

(51) Int. Cl.
G06Q 10/02 (2012.01)
G06F 16/22 (2019.01)
G06F 16/23 (2019.01)
G06F 16/25 (2019.01)
G06Q 50/12 (2012.01)
G06F 16/2455 (2019.01)
G06F 16/248 (2019.01)

(52) U.S. Cl.
CPC ............. *G06Q 10/02* (2013.01); *G06F 16/22* (2019.01); *G06F 16/23* (2019.01);
(Continued)

(58) Field of Classification Search
CPC ........ G06Q 10/02; G06Q 50/12; G06F 16/22; G06F 16/2379; G06F 16/23;
(Continued)

(56) References Cited

U.S. PATENT DOCUMENTS 6,678,700 B1 * 1/2004 Moore .................. G06F 16/256
7,761,377 B2 * 7/2010 Meier .................... G06Q 20/10
705/40

(Continued)

FOREIGN PATENT DOCUMENTS

FR          3021788 A1   12/2015
WO    WO-2012170565 A2  12/2012
(Continued)

OTHER PUBLICATIONS

U.S. Appl. No. 16/724,577, System and Method of Generating Aggregated Functional Data, filed Dec. 23, 2019.

*Primary Examiner* — Dung K Chau
(74) *Attorney, Agent, or Firm* — Perry + Currier

(57) ABSTRACT

A method of aggregating and updating heterogeneous data objects for a client subsystem includes: storing a set of data object definitions, each defining a mapping between an aggregated data object format and a plurality of supplier data object formats; storing a set of update definitions, each defining a mapping between an aggregated update operation and a plurality of supplier update mechanisms; receiving a data object in a supplier data object formats; selecting, based on the supplier data object format of the received data object, a data object definitions and generating an aggregated data object according to the selected definition; presenting the generated aggregated data object to the client subsystem; receiving an aggregated update operation from the client subsystem for updating the aggregated data object; and selecting, based on the received aggregated update operation, one of the update definitions and initiating a supplier update mechanism according to the selected update definition.

21 Claims, 9 Drawing Sheets

(52) U.S. Cl.
CPC ...... *G06F 16/2358* (2019.01); *G06F 16/2379* (2019.01); *G06F 16/248* (2019.01); *G06F 16/2456* (2019.01); *G06F 16/252* (2019.01); *G06F 16/258* (2019.01); *G06Q 50/12* (2013.01)

(58) Field of Classification Search
CPC .............. G06F 16/2456; G06F 16/258; G06F 16/2358; G06F 16/248; G06F 16/252
USPC .......................................................... 707/756
See application file for complete search history.

(56) References Cited

U.S. PATENT DOCUMENTS

| | | | |
|---|---|---|---|
| 2008/0120129 A1* | 5/2008 | Seubert | G06Q 10/10 705/35 |
| 2009/0254572 A1* | 10/2009 | Redlich | G06Q 10/06 |
| 2010/0161365 A1* | 6/2010 | Lokowandt | G06Q 30/0601 705/7.31 |
| 2010/0161366 A1* | 6/2010 | Clemens | G06Q 30/0201 705/7.29 |
| 2010/0161627 A1* | 6/2010 | Vossen | G06F 16/20 707/755 |
| 2016/0099826 A1* | 4/2016 | Logue | G06F 16/258 709/223 |
| 2018/0211189 A1 | 7/2018 | Bessassi et al. | |

FOREIGN PATENT DOCUMENTS

| | | |
|---|---|---|
| WO | WO-2013148470 A1 | 10/2013 |
| WO | WO-2017103864 A1 | 6/2017 |

* cited by examiner

SYSTEM AND METHOD FOR AGGREGATING AND UPDATING HETEROGENEOUS DATA OBJECTS

CROSS-REFERENCE TO RELATED APPLICATIONS

This application claims priority from French patent application no. 1905718, filed May 29, 2019, the contents of which are incorporated herein by reference.

FIELD

The specification relates generally to transmitting and altering data objects, and specifically to a system and method for aggregating and updating heterogeneous data objects.

BACKGROUND

Certain classes of products, including for example travel-related goods and services, may include a number of different types of products. For example, the general class of travel-related goods and services includes products such as flights, hotel reservations, automobile rentals, and the like. Multiple products within a class may be purchased in association with each other by a given user, such as one or more flights and a hotel reservation for a given trip. The individual products, however, may be provided by discrete supplier entities (e.g. airlines, hotels and the like) that employ distinct data-exchange infrastructure to store and communicate data defining the above-mentioned products. Therefore, retrieving and modifying data defining the products typically requires the user (or an entity acting on behalf of the user, such as a travel agency) to accommodate multiple distinct communication protocols, data formats and update mechanisms, which is costly and error-prone.

SUMMARY

An aspect of the specification provides a method of aggregating and updating heterogeneous data objects for a client subsystem, the method comprising: storing a set of data object definitions, each data object definition providing a mapping between an aggregated data object format and a plurality of supplier data object formats; storing a set of update definitions, each update definition providing a mapping between an aggregated update operation and a plurality of supplier update mechanisms; receiving a data object in one of the supplier data object formats; selecting, based on the supplier data object format of the received data object, one of the data object definitions and generating an aggregated data object according to the selected data object definition; storing the aggregated data object in an aggregated data record in a repository; presenting the generated aggregated data object to the client subsystem; receiving an aggregated update operation from the client subsystem for updating the aggregated data object; updating the aggregated data object stored in the aggregated data record in the repository in accordance with the aggregated update operation; and selecting, based on the received aggregated update operation, one of the update definitions and initiating a supplier update mechanism according to the selected update definition.

Another aspect of the specification provides an aggregator server, comprising: a memory storing: a set of data object definitions, each data object definition providing a mapping between an aggregated data object format and a plurality of supplier data object formats; and a set of update definitions, each update definition providing a mapping between an aggregated update operation and a plurality of supplier update mechanisms; a processor interconnected with the memory, the processor configured to: receive a data object in one of the supplier data object formats; select, based on the supplier data object format of the received data object, one of the data object definitions and generate an aggregated data object according to the selected data object definition; store the aggregated data object in an aggregated data record in a repository; present the generated aggregated data object to the client subsystem; receive an aggregated update operation from the client subsystem for updating the aggregated data object; update the aggregated data object stored in the aggregated data record in the repository in accordance with the aggregated update operation; and select, based on the received aggregated update operation, one of the update definitions and initiate a supplier update mechanism according to the selected update definition.

BRIEF DESCRIPTIONS OF THE DRAWINGS

Embodiments are described with reference to the following figures, in which.

DETAILED DESCRIPTION

Figure 1:
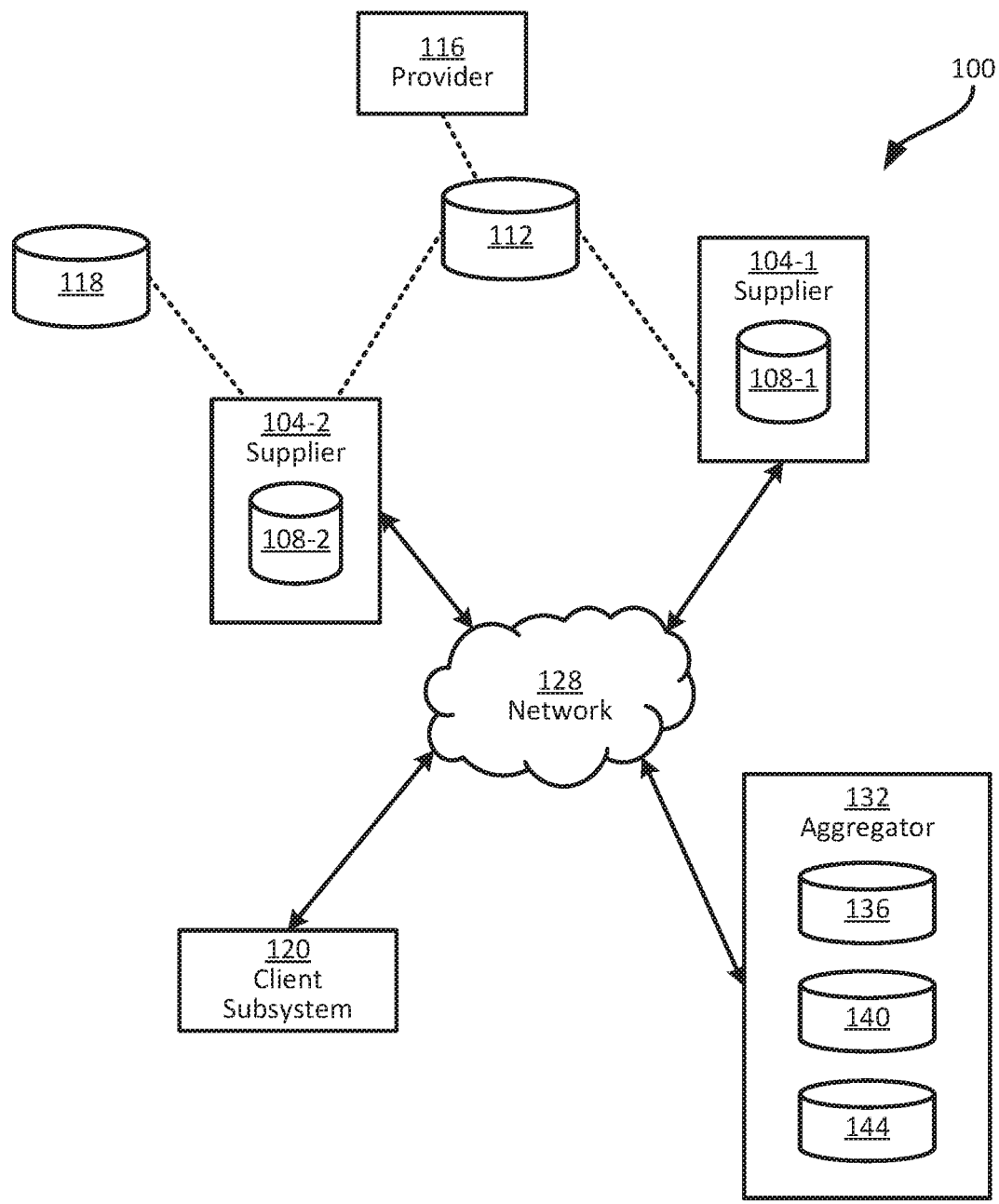
FIG. 1 depicts a system for aggregating and updating heterogeneous data objects.

FIG. 1 depicts a system 100 for aggregating and updating heterogeneous data objects. The data objects, in the embodiments discussed herein, define products such as travel-related goods and services such as flights, hotel reservations, vehicle rentals, and related services (e.g. baggage check services for flights, lounge access at airports, WiFi access on flights or at hotels, and so on). As will be apparent to those skilled in the art, however, the systems and methods discussed below can also be applied to various other types of data objects (that is, data objects defining a wide variety of other forms of products).

Delivery of the above-mentioned products to customers is typically implemented by a provider entity, such as an airline for flights, a rental agency for vehicle rentals, and the like. Prior to delivery of the products to customers (e.g. passengers on a flight), the products must be purchased or otherwise secured on behalf of the customers, via a series of data exchanges. To that end, the system 100 includes one or more supplier subsystems, of which two examples 104-1 and 104-2 are shown (collectively referred to as supplier subsystems 104, or simply suppliers 104). Data objects maintained by or on behalf of each supplier defines the products available for purchase, or already purchased, from the supplier. The above-mentioned data objects are also referred to as a supplier data objects in the discussion below.

The supplier subsystems 104 can be, but are not required to be, operated by the above-mentioned providers. For example, the supplier 104-1 is operated in the present example by an airline (i.e. a provider). For instance, the supplier 104-1 may exchange data with other components of the system 100 to enable the provision of products according to the eXtensible Markup Language (XML)-based New Distribution Capability (NDC) standard. The supplier 104-1 maintains a repository 108-1 defining product inventory, such as flights operated by the airline that are available for booking, or have been booked.

Other supplier subsystems 104 can be operated by third parties not directly responsible for the provision of the products to customers. For example, the supplier 104-2, in the present example, is a Global Distribution System (GDS) operated by a third party that stores a repository 108-2 defining product inventory and/or bookings. The supplier 104-2 can retrieve data for the repository 108-2 from various other components of the system 100, including, for example, a Central Reservation System (CRS) 112 containing inventory data for a further provider 116 (e.g. another airline), and a pricing or tariff repository 118. Indeed, as shown in FIG. 1, the CRS 112 can also contain inventory data retrieved from the supplier 104-1 itself. That is, the provider operating the supplier subsystem 104-1 can arrange for the provision of products through more than one distribution channel.

The system 100 can include a wide variety of additional supplier subsystems 104, including additional GDS subsystems, and/or additional provider-operated subsystems. For example, the system 100 can include a further GDS-based supplier for low-cost carrier airlines.

The system 100 also includes a client subsystem 120, for example operated by a travel agency or the like, configured to interact with the supplier subsystems 104 via a network 128 including any suitable combination of local- and wide-area networks (including the Internet). The client subsystem 120, as will be discussed in greater detail below, is configured to obtain supplier data objects from the supplier subsystems 104, and to request updates to the supplier data objects in order to book the above-mentioned products on behalf of customers (e.g. individual persons). Additional client subsystems (not shown) may also be included in the system 100.

As will now be apparent, the client subsystem 120 may interact with a number of different supplier subsystems 104 on behalf of any given customer. Each supplier subsystem 104 may store and exchange supplier data objects in divergent formats (e.g. according to different communication standards or protocols, and employing different combinations and hierarchies of fields within the data objects). Further, each supplier subsystem 104 may implement different update mechanisms for purchasing (which may also be referred to as booking) the above-mentioned products, and for making changes to existing purchases.

The heterogeneous nature of the supplier data objects and the update mechanisms provided by the supplier subsystems 104 may impose a substantial technical burden on the client subsystem 120 (and any other client subsystems in the system 100), by requiring that each client subsystem implement communication mechanisms to interact with each supplier subsystem 104. Further, the variable nature of the supplier data objects maintained by the supplier subsystems 104 may lead to inconsistent presentation of information at the client subsystem 120, which in turn may cause erroneous or malformed purchase requests to be transmitted to the supplier subsystems 104. Prior approaches to serving data from multiple supplier subsystems 104 to the client subsystem 120 implement an intermediate subsystem that retrieves data from multiple supplier subsystems 104 and presents the data to the client subsystem 120, for example in the form of a combined passenger name record (PNR) (e.g. the Total Travel Record, TTR, provided by Amadeus S.A.S.). Such combined records, however, may still present data from different suppliers according to distinct supplier-specific formats. Further, as will be discussed below, in such systems updating data typically requires the use of different, supplier-specific, update mechanisms.

The system 100 therefore also includes an aggregator server 132, also referred to herein simply as the aggregator 132, configured to intermediate between the supplier subsystems 104 and the client subsystem 120 (and, more generally, any client subsystem of the system 100). The aggregator 132, as will be discussed below in greater detail, is configured to obtain supplier data objects from one or more supplier subsystems 104 (e.g. in response to a request from the client subsystem 120). The aggregator 132 is further configured to generate aggregated data objects corresponding to the supplier data objects, based on a set of data object definitions 136. The aggregated data objects are stored at the aggregator 132 in a repository 140.

The data object definitions 136, in general, define mappings between the various supplier data object formats noted above and a single aggregated data object format. The generation of aggregated data objects enables the aggregator 132 to present data objects from a plurality of different suppliers to the client subsystem 120 according to a consistent format, reducing the technical burden on the client subsystem 120 that would otherwise be imposed by the need to support multiple supplier data object formats. For example, each client subsystem 120 need only be implemented to interpret, store and manipulate the aggregated data objects. The deployment and operation of client subsystems is therefore simplified by centralizing the complexity of interpreting multiple supplier data object formats at the aggregator 132.

The aggregator 132 is also configured to provide a set of aggregated update operations to the client subsystem 120, e.g. in the form of an application programming interface (API). The client subsystem 120 can therefore request any of a variety of updates to the supplier data objects (regardless of the particular format of a given supplier data object) by transmitting an aggregated update request to the aggregator 132. The aggregator 132 is configured, based on a set of update definitions 144, to generate one or more supplier-specific update operations in response to receiving an aggregated update request from the client subsystem 120. In other words, the aggregator 132 is configured to initiate one or more of the previously mentioned update mechanisms specified by the suppliers 104 in response to the request from the client subsystem 120. The client subsystem 120, in turn, need not implement multiple independent update mechanisms in order to cause updates to be made to supplier data objects.

In contrast to the prior approaches mentioned earlier, the implementation of a common set of aggregated update mechanisms for use by all client subsystems simplifies communications between the client subsystems 120 and the aggregator 132 (e.g. reducing the number of transactions between client subsystems 120 and the aggregator 132 to update data at a supplier subsystem 104). For example, each of several single-step or multi-step update mechanisms required by different supplier subsystems 104 can be initiated with the same common request by a client subsystem 120. This arrangement also simplifies the integration of additional supplier subsystems 104 into the system 100, as only the aggregator 132 requires updating to account for any additional update mechanisms. The client subsystems 120, meanwhile, continue to use the same common set of aggregated update operations.

Figure 2:
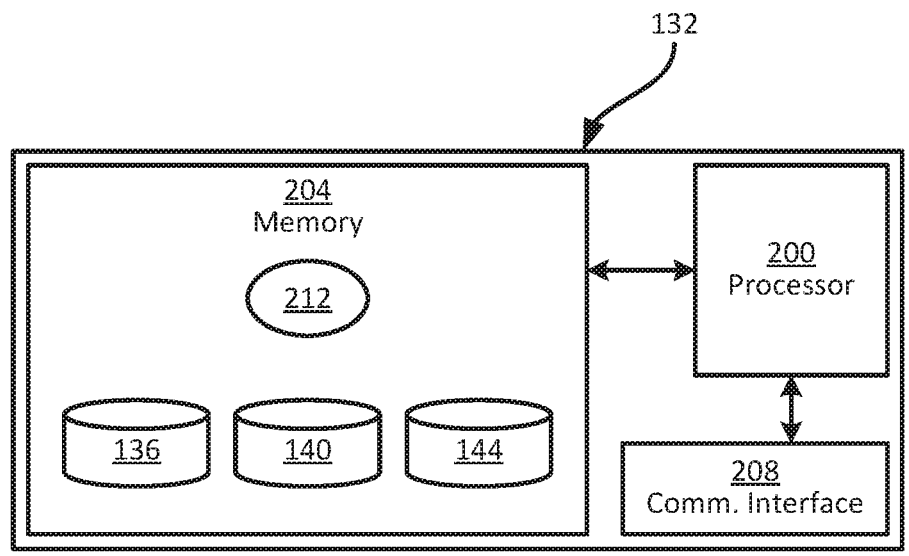
FIG. 2 depicts certain internal components of the aggregator server of FIG. 1.

Turning to FIG. 2, before discussing the functionality of the system 100 in greater detail, certain components of the aggregator 132 will be discussed in greater detail.

As shown in FIG. 2, the aggregator 132 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the aggregator 132 to communicate with the other computing devices of the system 100 (i.e. the supplier subsystem 104 and the client subsystem 120) via the network 128. The communication interface 208 therefore includes any necessary components (e.g. network interface controllers (NICs), radio units, and the like) to communicate via the network 128. The specific components of the communication interface 208 are selected based on the nature of the network 128. The aggregator 132 can also include input and output devices connected to the processor 200, such as keyboards, mice, displays, and the like (not shown).

The components of the aggregator 132 mentioned above can be deployed in a single enclosure, or in a distributed format. In some examples, therefore, the aggregator 132 includes a plurality of processors, either sharing the memory 204 and communication interface 208, or each having distinct associated memories and communication interfaces.

The memory 204 stores the data object definitions 136, the aggregated data object repository 140, and the update definitions 144 mentioned above in connection with FIG. 1. The memory 204 also stores a plurality of computer-readable programming instructions, executable by the processor 200, in the form of various applications, including an aggregation application 212. As will be understood by those skilled in the art, the processor 200 executes the instructions of the application 212 (and any other suitable applications) in order to perform various actions defined by the instructions contained therein. In the description below, the processor 200, and more generally the aggregator 132, are said to be configured to perform those actions. It will be understood that they are so configured via the execution (by the processor 200) of the instructions of the applications stored in memory 204. Execution of the application 212, as will be discussed below, configures the aggregator 132 to generate aggregated data objects from supplier data objects according to the data object definitions 136, for presentation to the client subsystem 120. Execution of the application 212 also configures the aggregator 132 to receive aggregated update operations from the client subsystem 120 and, based on the update definitions 144, to initiate supplier-specific update mechanisms for updating the supplier data objects at one or more of the supplier subsystems 104.

Figure 3:
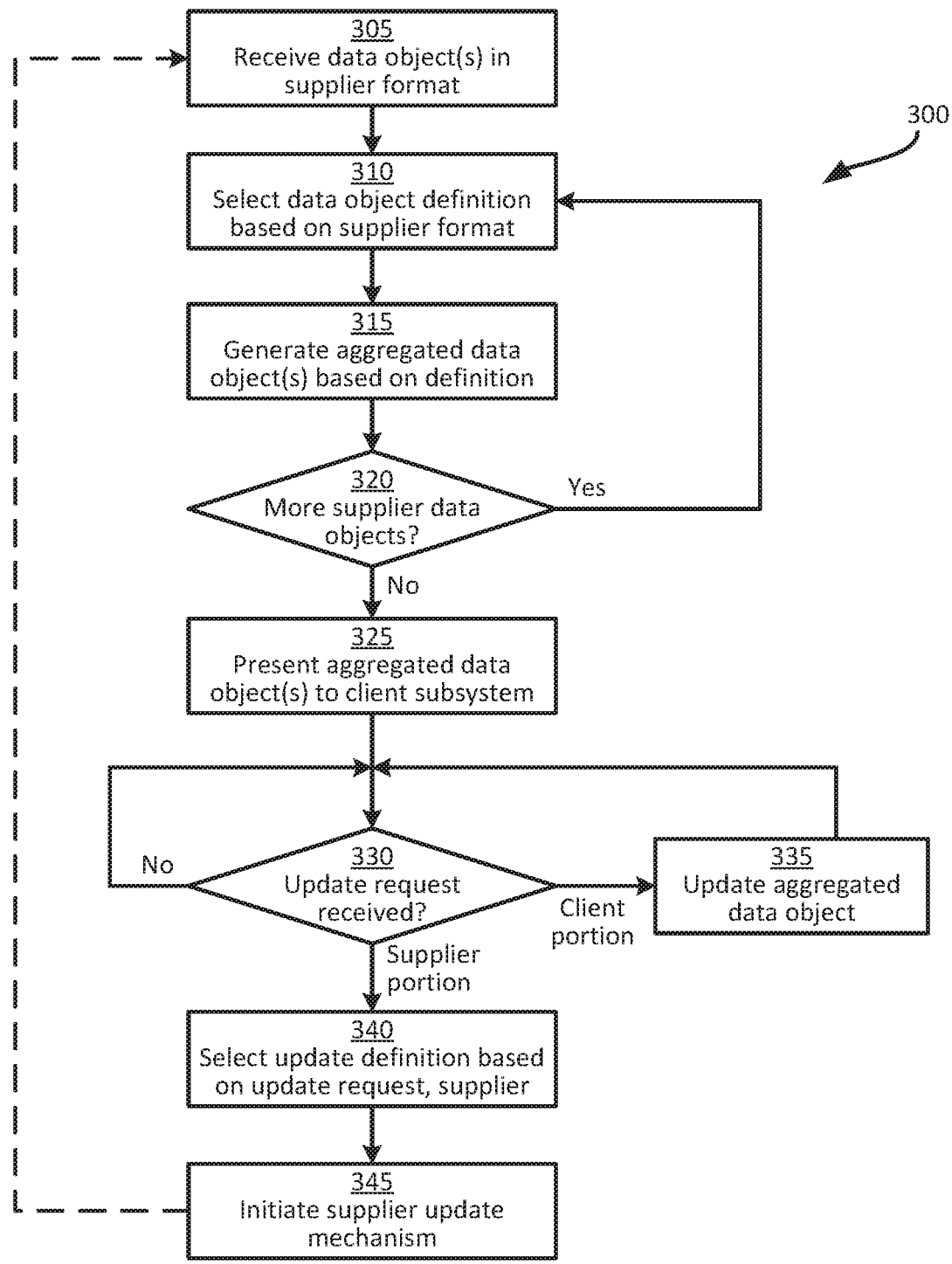
FIG. 3 depicts a method of aggregating and updating heterogeneous data objects in the system of FIG. 1.

Turning now to FIG. 3, certain aspects of the operation of the system 100 will be described in greater detail. Specifically, FIG. 3 illustrates a method 300 of aggregating and updating heterogeneous data objects. The method 300 will be described in conjunction with its performance within the system 100. In particular, the blocks of the method 300 are performed by aggregator 132 via the execution of the application 212 by the processor 200.

Figure 4:
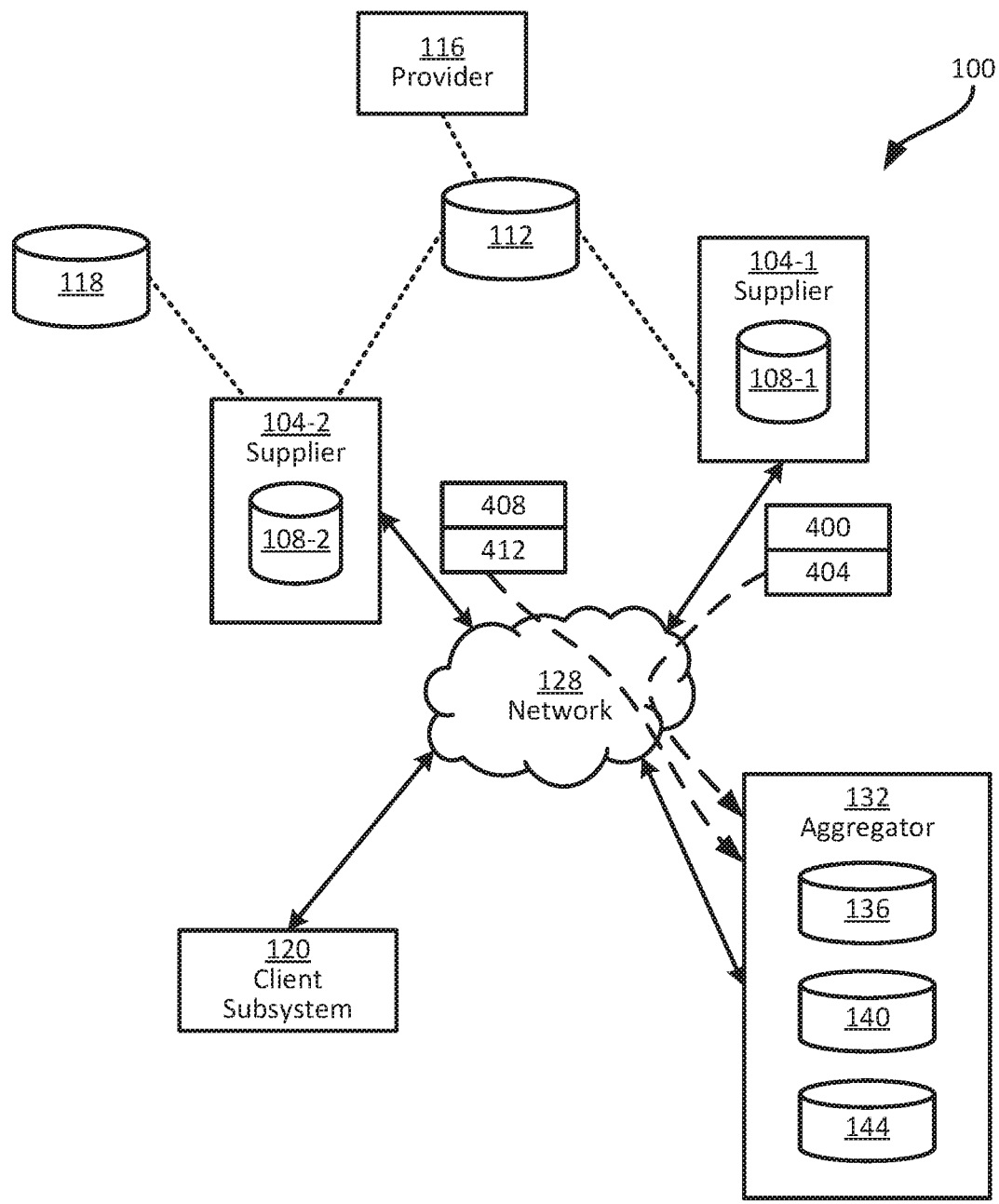
FIG. 4 depicts the receipt of supplier data objects at the aggregator server of FIG. 1 during the performance of the method of FIG. 3.

At block 305, the aggregator 132 is configured to receive one or more supplier data objects formatted according to the above-mentioned supplier formats. The data objects received at block 305 need not be received from the same supplier 104, and need not be received simultaneously. For example, the data objects received at block 305 can be received in response to one or more requests transmitted from the aggregator 132 (e.g. following a request from the client subsystem 120) to one or more suppliers 104. In the present example, as will be discussed below in greater detail and as illustrated in FIG. 4, four supplier data objects are received at block 305. Specifically, two supplier data objects 400 and 404 are received at the aggregator 132 from the supplier subsystem 104-1, and two supplier data objects 408 and 412 are received at the aggregator 132 from the supplier subsystem 104-2.

At block 310, responsive to receiving the supplier data objects, the aggregator 132 is configured, for a first supplier data object, to select one of the data object definitions 136. Specifically, the data object definitions 136 contain distinct definitions for each pair of a distribution channel and an object type. The aggregator 132 is configured to determine the distribution channel and object type for each receive data object based on one or both of the sender of the data object, and the contents of the data object itself. For example, the aggregator 132 can store supplier profile data in the memory 204 that contains, for each supplier 104, a supplier identifier and a corresponding distribution channel indicator. In other examples, the distribution channel can be derived from the data object itself. For example, in the case of the data objects 408 and 412, the aggregator 132 can be configured to determine that the data objects 408 and 412 are structured according to the EDIFACT standard, and that the distribution channel associated with the data objects 408 and 412 is therefore GDS. As will be understood by those skilled in the art, however, the data structure of the data objects may not necessarily dictate the distribution channel.

Object types may, for example, be determined by examining the content of a data object. For example, a data object containing the string ".AIR" relates to an airline reservation, while a data object containing the string ".HTL" relates to a hotel reservation. A wide variety of other strings or indicators may also be detected by the aggregator 132 to determine object types. As will now be apparent to those skilled in the art, data object types correspond to different types of products (e.g. flight bookings, hotel reservations, and the like).

At blocks 315 and 320, the aggregator 132 is configured to generate one or more aggregated data objects from the data objects received at block 305. As will be discussed in greater detail below, the aggregator 132 does not necessarily generate the same number of aggregated data objects as the number of supplier data objects received. More specifically, at block 315 the aggregator 132 is configured to apply the selected data object definition to a received data object, and at block 320 the aggregator 132 is configured to determine whether any data objects remain to be processed. When the determination at block 320 is affirmative, the performance of blocks 310 (data object definition selection) and block 320

(aggregated data object generation according to the selection definition) are repeated until a negative determination at block 320.

Figure 5A:
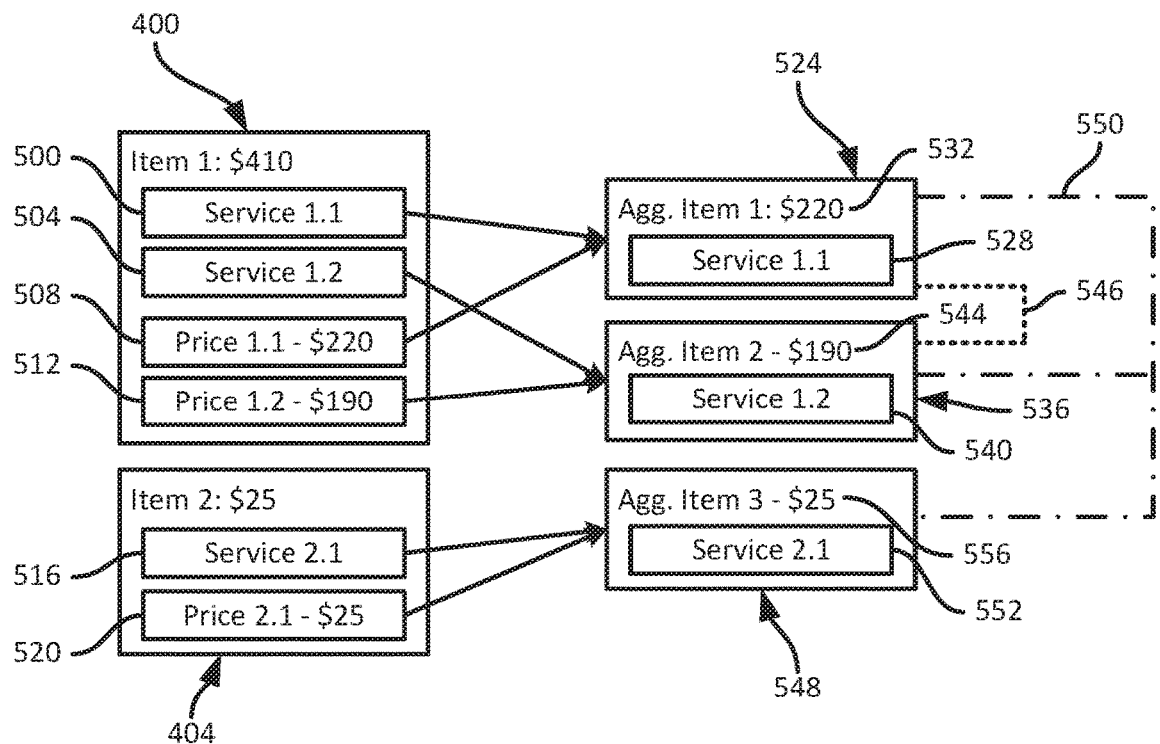
FIGS. 5A and 5B illustrate the mapping of supplier data objects to aggregated data objects.
Figure 5B:
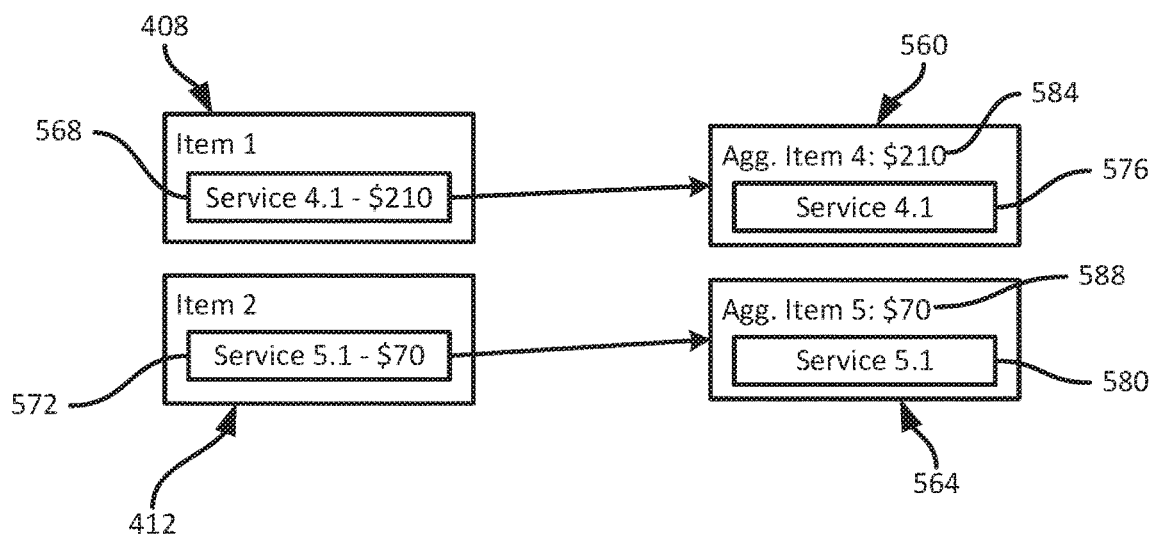

Turning to FIGS. 5A and 5B, the generation of aggregated data objects corresponding to the supplier data objects 400/404, and 408/412, respectively, will be described to illustrate the performance of blocks 310-320 as well as the nature of the data object definitions 136. Referring first to FIG. 5A, the contents of the supplier data objects 400 and 404 is illustrate schematically. As will be apparent to those skilled in the art, the supplier data objects 400 and 404 are typically transmitted not in the graphical form shown in FIG. 5A, but in a suitable predefined structure such as a series of XML name/value pairs arranged in a predefined hierarchy.

As illustrated in FIG. 5A, the supplier data object 400 contains a plurality of elements, including first and second service descriptors 500 and 504, and first and second pricing elements 508 and 512. The service descriptors 500 and 504 can contain one or more fields defining properties of the corresponding product. For example, the service descriptor 500 may define an outgoing flight, and therefore contain an origin location, a destination location, an airline identifier, departure and arrival times, and the like. The service descriptor 504 may define a return flight, and therefore include similar properties as those noted above in connection with the service descriptor 504. The pricing elements 508 and 512 contain pricing information for the service descriptors 500 and 504, respectively. Thus, the pricing element 508 contains a price for the outgoing flight mentioned above, as defined by the service descriptor 500, while the pricing element 512 contains a price for the return flight defined by the service descriptor 504. The supplier data object 404 includes a service descriptor 516, which for example defines a baggage check product (e.g. associated with one or both of the flights defined in the supplier data object 400). The supplier data object 404 also includes a pricing element 520.

The mapping of the supplier data objects 400 and 404 to aggregated data objects is illustrated schematically by way of arrows indicating which information from the data objects 400 and 404 is mapped to which aggregated data objects. In particular, as seen in FIG. 5A the data object definition for air-related data objects received from the supplier subsystem 104-1 causes the aggregator 132 to generate three aggregated data objects (which may also be referred to as travel items) containing the data in the two supplier data objects 400 and 404. Specifically, a first aggregated data object 524 contains a service descriptor 528 corresponding to the service descriptor 500, and defines a price 532 for the service, retrieved from the pricing element 508. The aggregated service descriptor 528 may be identical to the service descriptor 500, or the fields in the service descriptor 500 may be mapped to predefined fields in the aggregated service descriptor 528 that are equivalent but not identical (e.g. fields may be renamed, units may be converted, and the like), according to the data object definition.

A second aggregated data object 536 includes an aggregated service descriptor 540 corresponding to the service descriptor 504, as well as a price 544 corresponding to the pricing element 512. That is, the contents of the data object 400 has been split, via the performance of block 315, into two aggregated data objects. More specifically, in the present example, the data object definitions 136 cause the aggregator 132 to map each pair of a service and pricing element to a separate aggregated data object, such that each aggregated data object represents a product with one price (as opposed to representing two products with distinct prices, as with the supplier data object 400). When the mapping results in the generation of more than one aggregated data object for a single supplier data object, as is the case in FIG. 5A, the aggregator 132 is also configured to generate and store a link 546 associating the aggregated data objects 524 and 536. The link 546 can be stored within one (or both) of the aggregated data objects 524 and 536, in a separate repository, or the like. The link 546 indicates, in general, that the aggregated data objects 524 and 536 are connected by requirement of the supplier subsystem 104-1 and must be updated simultaneously. The supplier subsystem 104-1 may, for example, permit updates to be made only to a data object as a whole rather than to individual elements within the data object. The link 546 thus serves, as will be discussed below in greater detail, to permit the aggregator 132 to generate correctly formed update requests in the event that the client subsystem 120 requests an update to only one of the aggregated data objects 524 and 536.

A third aggregated data object 548 contains an aggregated service descriptor 552 corresponding to the service descriptor 516 and defines a price 556 corresponding to the pricing element 520. No link connects the aggregated data object 548 with the data objects 524 or 536, because the supplier subsystem 104-1 (as seen on the left side of FIG. 5A) did not specify that the data objects 400 and 404 are linked. That is, each data object 400 and 404 may be updated independently. In other examples, however, in which the supplier subsystem 104-1 transmitted the data objects 400 and 404 as a single offer, indicating that the data objects 400 and 404 must be manipulated simultaneously, the aggregator 132 may also generate one or more additional links, such as a link 550 connecting the aggregated data objects 524 and 536 with the aggregated data object 548.

The above-mentioned links (e.g. the link 550) can contain additional parameters beyond the identifiers of the linked data objects. Examples of such parameters include, in the case of links indicating supplier-imposed connections between data objects, time periods for which an offer is valid, offer identifiers (e.g. received from the supplier subsystem 104-1) and the like.

Turning to FIG. 5B, the supplier data objects 408 and 412 (received from the supplier subsystem 104-2) are illustrated, along with their mapping to aggregated data objects 560 and 564. The supplier data objects 408 and 412 each include a service descriptor 568 and 572, respectively, defining both a service and a price for the service. The service descriptor 568 may, for example, define a flight and the service descriptor 572 may define a seat selection product corresponding to the above flight.

As shown in FIG. 5B, the data object definitions 136 define a mapping, for air-related data objects from the supplier subsystem 104-2, that maps each data object 408 and 412 to a distinct aggregated data object, since the data objects 408 and 412 (and more generally, any data object from the supplier subsystem 104-2) contain single service descriptors with pricing information. Therefore, the aggregated data objects 560 and 564 include respective service descriptors 576 and 580, as well as respective prices 584 and 588.

As will now be apparent, the different mappings applied according to the data object definitions 136 result in a set of aggregated data objects with certain common characteristics that are not necessarily present in the supplier data objects received at block 305. For example, the aggregated data objects 524, 536, 548, 560 and 564 each define a single service having a single price. Various other characteristics may also be normalized between the aggregated data objects. For example, some supplier subsystems 104 may store customer identifiers (e.g. traveler names) in separate fields for first and last names, while other subsystems may store such identifiers in single fields. The data object definitions 136 can also specify a common format (e.g. a single name field) for customer identifiers.

Figure 6:
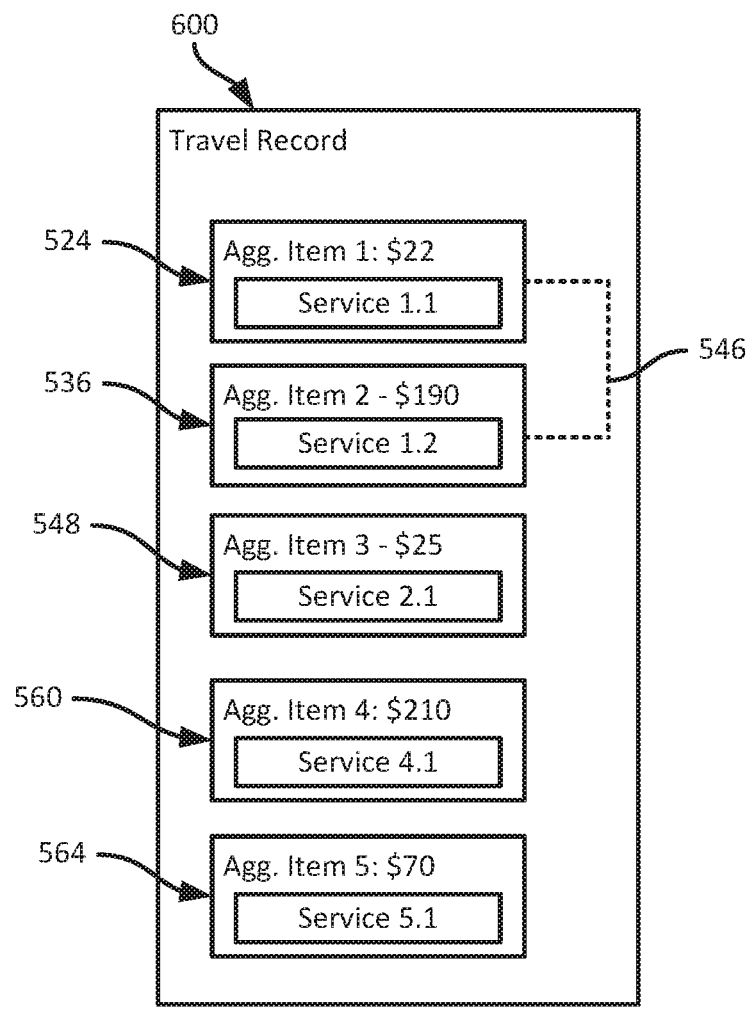
FIG. 6 illustrates an example aggregated data record for presentation of the client subsystem of FIG. 1.

Returning to FIG. 3, following the generation of the aggregated data objects noted above, the determination at block 320 is negative, and the performance of the method 300 proceeds to block 325. At block 325, the aggregator 132 is configured to present the aggregated data objects generated via blocks 310-320 to the client subsystem 120. For example, as shown in FIG. 6, the aggregator 132 can be configured to generate an aggregated data record 600 containing the data objects 524, 536, 548, 560 and 564. The aggregated data objects can be collected into aggregated data records such as the record 600 illustrated based on various criteria.

In the present example, it is assumed that each of the aggregated data objects 524, 536, 548, 560 and 564 contain the same customer identifier. That is, each of the above noted aggregated data objects define products retrieved on behalf of (e.g. prior to booking and purchasing), purchased by, or otherwise associated with, a given customer of the client subsystem 120. The customer identifier need not be the criterion (or at least the sole criterion) defining which aggregated data objects are combined into an aggregated data record, however. Further, in some embodiments aggregated data objects can be combined into an aggregated data record based on attributes other than a customer identifier. For example, an aggregated data record can contain aggregated data objects for a plurality of customer identifiers (e.g. corresponding to members of a family, individuals associated with a common business, and the like).

As already mentioned above, the aggregator 132 may store the aggregated data objects in the repository 140. Hence, the aggregator may store the aggregated data record 600 containing the data objects 524, 536, 548, 560 and 564 in the repository 140.

Presenting the aggregated data record 600 to the client subsystem 120 can include transmitting the aggregated data record 600 to the client subsystem 120 via the network 128, e.g. in response to a request from the client subsystem 120. Following receipt of the aggregated data record 600, the client subsystem 120 can be configured to display, print or otherwise output the aggregated data record 600, or to further transmit the aggregated data record 600, e.g. to a customer computing device (not shown). As will be apparent from FIG. 6, the mapping of supplier data objects to aggregated data objects enables the aggregator 132 to present the services and pricing information received from the suppliers 104 to the client subsystem 120 in a consistent format.

Returning to FIG. 3, at block 330 the aggregator 132 is configured to determine whether an update request has been received from the client subsystem 120 in association with any of the aggregated data objects transmitted at block 325. When the determination at block 330 is negative, the aggregator 132 awaits an update request (i.e. repeats block 330). The aggregator 132 can also receive other supplier data objects; that is, one or more additional instances of the method 300 can be performed simultaneously (e.g. for data objects associated with different customers).

When the determination at block 330 is affirmative, the aggregator 132 is configured to perform one of blocks 335 and 340, according to the nature of the update request. The aggregated update operations mentioned earlier include update operations relating to client portions of the aggregated data objects, and update operations relating to supplier portions of the aggregated data objects. The contents of the aggregated data objects discussed above, in connection with FIGS. 5A-5B and 6, is derived entirely from the supplier data objects, and is therefore contained in supplier portions of the aggregated data objects. The aggregated data objects may also, however, include client portions that contain data not received from, nor sent to, the suppliers 104. A wide variety of data may be stored in client portions of the aggregated data objects. Examples of client data include price markups charged by the client subsystem 120 (and therefore maintained alongside the price paid to the suppliers, such as the prices 532 and 544 mentioned above), freeform notes, and package identifiers linking aggregated data objects.

Each of the above-mentioned forms of client-portion data are inserted into aggregated data objects, or altered if previously inserted, via dedicated aggregated update operations (e.g. API calls). The aggregated update operations that correspond to data store in client portions of the aggregated data records, however, are not mapped to supplier update mechanisms. That is, only certain API calls are mapped to supplier update mechanisms (those API calls relating to data stored in the supplier portions of the aggregated data records).

Figure 7:
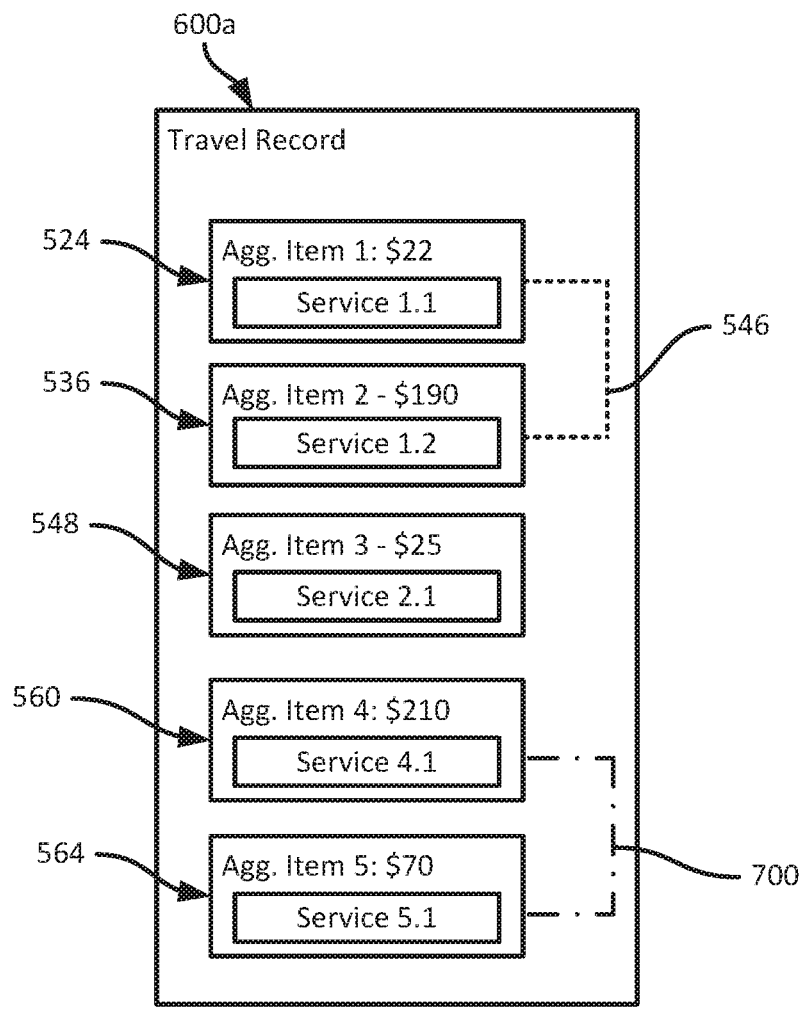
FIG. 7 illustrates an updated aggregated data record.

FIG. 7 illustrates an example update to the data record 600 made via a performance of block 335. In particular, at block 330 it is assumed that the client subsystem 120 transmits a request to the aggregator 132 to link the aggregated data objects 560 and 564 (which, as mentioned earlier, define a flight and a seat selection; the data objects 560 and 564 can define any of a wide variety of products, however, which need not originate from the same supplier subsystems 104). Linking aggregated data objects permits the client subsystem 120 to create packaged services, which may be purchased by end users only as a set. For example, links generated by the client subsystem 120 can be employed to implement virtual interlining in the system 100. In an example implementation of virtual interlining, the client subsystem 120 can update the aggregated data record with a link between aggregated data objects each defining distinct segments of a flight from an origin location to a destination location, via at least one intermediate location. Each aggregated data object (i.e. each segment of the flight) may originate from a distinct supplier, and the aggregated data objects as received from the supplier subsystems 140 may therefore not specify any links. The client subsystem 120, however, can impose links to package the segments into a single purchasable flight. In further examples, such a package may include additional linked aggregated data objects, such as an object defining an insurance service offered by the client subsystem 120 (e.g. providing for reimbursement in the event that delays on one segment of the flight cause the end user to miss a subsequent leg of the flight).

Such links may also permit the client subsystem to create tracked sets of products, which may still be purchased separately but which are initially presented together to end users. The aggregator 132, at block 335, is configured to store a link 700 between the aggregated data objects 560 and 564 responsive to the request received at block 330. As illustrated schematically in FIG. 7, the link 700 is distinguished from the link 546 (e.g. by a link type indicator), to indicate that the link 700 is client-imposed rather than supplier-imposed. That is, the link 700 is considered part of the client portion of the data records 560 and 564, and can therefore be altered or removed by the client subsystem 120 without requiring communications with the supplier subsystem 104-2.

Following the performance of block 335, the performance of the method 300 returns to block 330 to await a further update request. Following a request from the client subsystem 120 to update a supplier portion of an aggregated data object at block 330, the aggregator 132 proceeds to block 340. At block 340, the aggregator 132 is configured, according to the update definitions 144, to select one or more supplier update mechanisms that correspond to the requested update. The update definitions define, for each combination of distribution channel and object type (or simply for each supplier 104), an update mechanism, or set thereof, that implement each API call (i.e. each update request available to the client subsystem 120). The aggregator 132 is therefore configured to determine the distribution channel and object type of the aggregated data object to which the update applies, and to select the corresponding update mechanism. As will be apparent to those skilled in the art, an update request may affect multiple aggregated data objects (e.g. when the data objects are linked), and the receipt of an update request may therefore lead to the selection and execution of more than one supplier update mechanism.

Examples of update requests received at block 330 that lead to block 340 include requests to book (i.e. confirm) an offer defined by an aggregated data object, requests to delete an aggregated data object (e.g. cancel a previously booked service), and the like. In the present example, the request received at block 330 is assumed to be a request to book/confirm the product defined by the aggregated data object 524. Upon receipt of the update request, the aggregator 132 is configured to retrieve the update definitions, and select a supplier update mechanism based on the distribution channel and object type of the aggregated data object 524. Having selected the supplier update mechanism, the aggregator 132 is configured to initiate the supplier update mechanism at block 345 by generating update payload data for transmission to the relevant supplier subsystem in one or more messages formatted and sequenced according to the selected supplier update mechanism.

Figure 8:
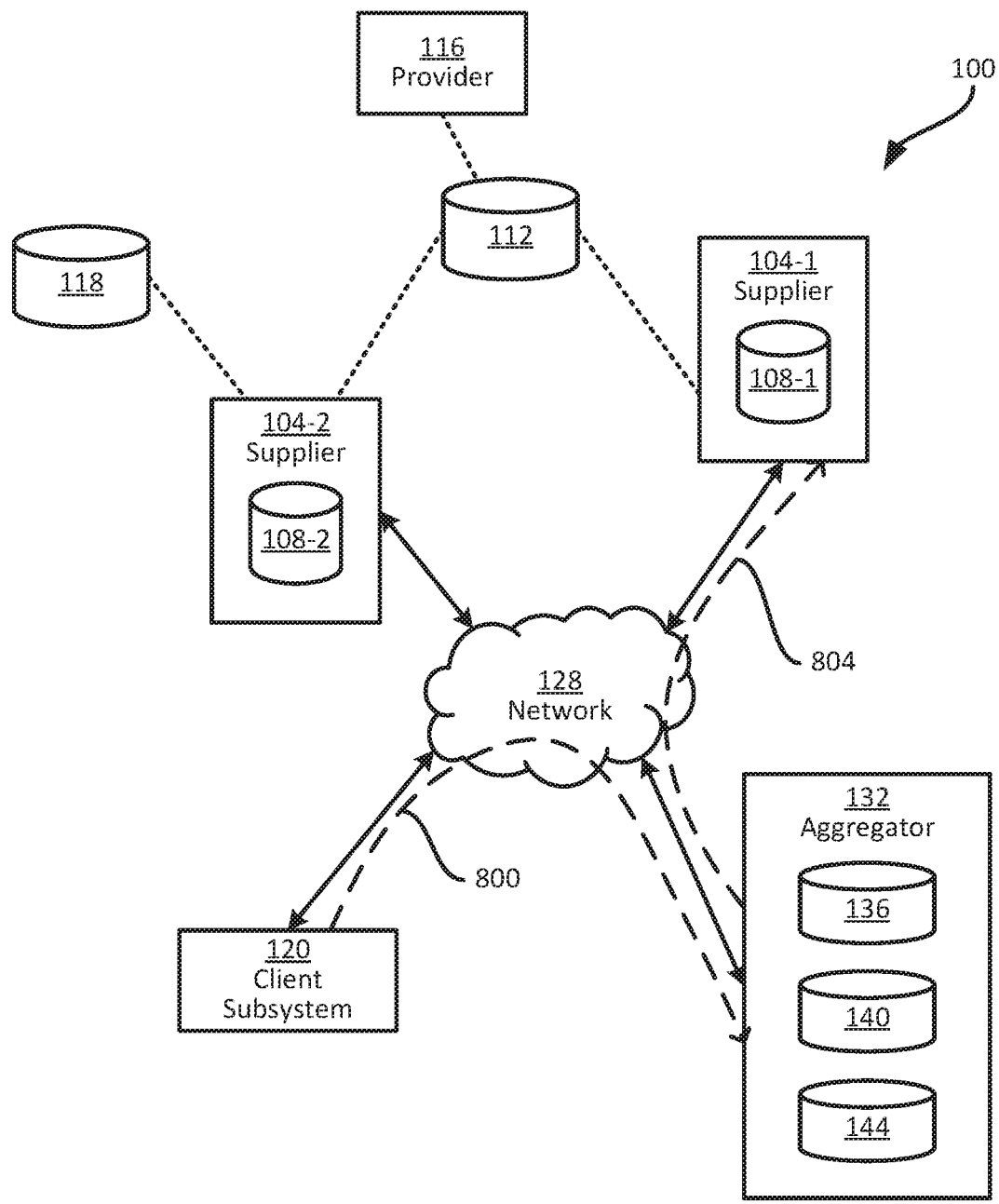
FIGS. 8-9 illustrate example update operations performed by the aggregator server of FIG. 1.

Turning to FIG. 8, an example performance of blocks 340 and 345 is illustrated following the receipt of a request 800 from the client subsystem 120 to confirm the aggregated data object 524. In response to the request 800, the aggregator 132 is configured to select a supplier update mechanism corresponding to the supplier 104-1 (i.e. the supplier 104 corresponding to the aggregated data object 524). For example, the distribution channel employed by the supplier 104-1 may be NDC, and as noted earlier the aggregated data object 524 defines an air-related product. Therefore, at block 340 the aggregator 132 is configured to select an update mechanism requiring the transmission of an order change message 804. The message 804 can include various payload data, such as an identifier of the data object 400 (from which the aggregated data object 524 was generated), payment data, and the like. In response to the message 804, the aggregator 132 may receive a confirmation message from the supplier 104-1, e.g. including an order identifier, which may be stored in the aggregated data object 524. Specifically, the order identifier may be stored as an attribute of the link 546. As will now be apparent, the above update results in confirming both aggregated data objects 524 and 536, which originate from the same supplier data object 400.

Figure 9:
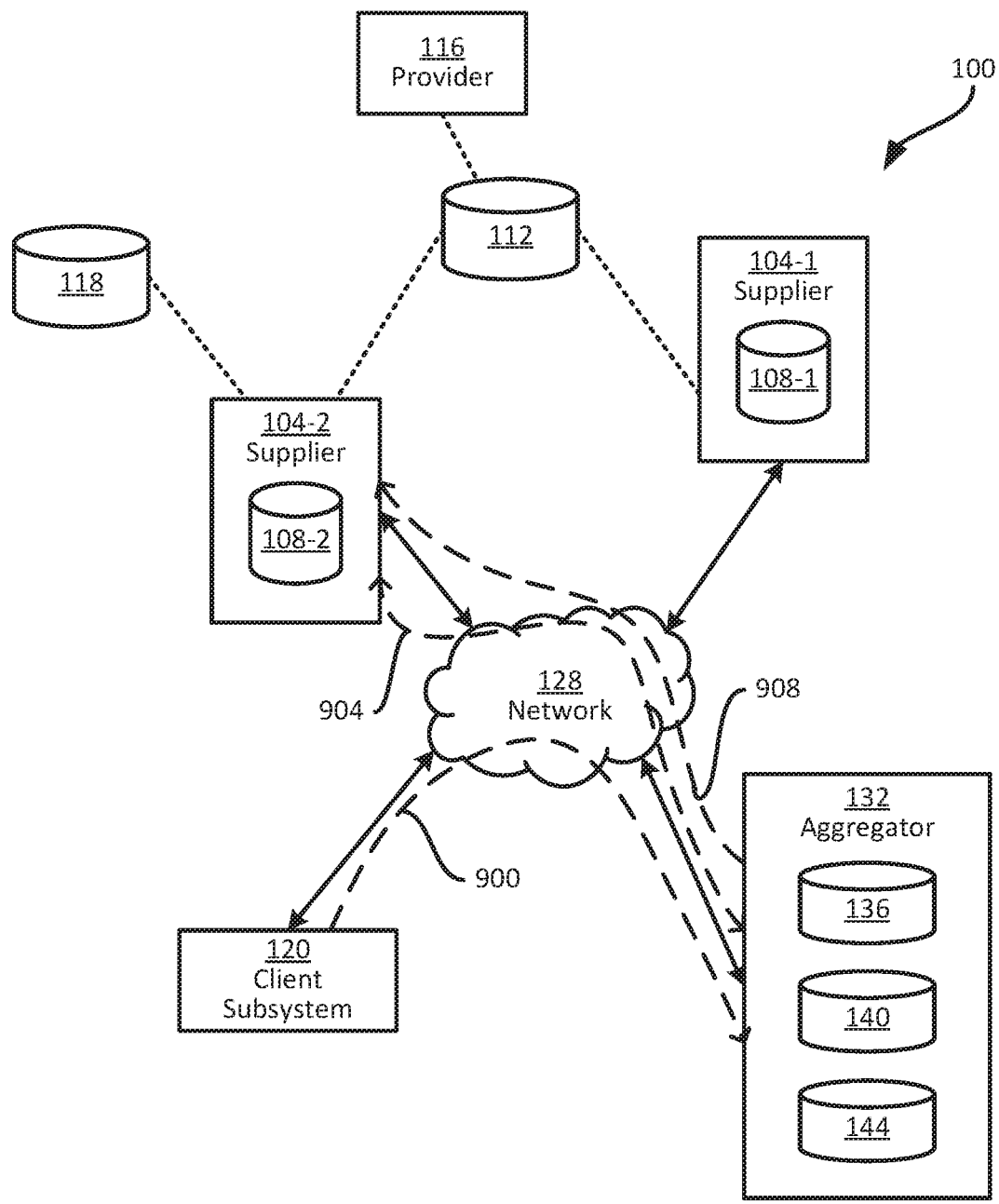

Turning to FIG. 9, a further example performance of blocks 340 and 345 is illustrated, resulting from a request 900 from the client subsystem 120 to confirm the aggregated data object 560. The distribution channel employed by the supplier 104-2 may be GDS as mentioned earlier, and the aggregated data object 560 defines an air-related product. Therefore, at block 340 the aggregator 132 is configured to select an update mechanism corresponding to GDS-based air products. As shown in FIG. 9, the update mechanism includes a first request 904 from the aggregator 132 to the supplier 104-2 to obtain a booking reference, and a second request 908 to provide payment for the booking. Other sequences of requests can also be implemented by the aggregator 132 (e.g. distinct requests to obtain a booking reference and pricing information, respectively, followed by a further request to initiate payment). Following successful transmission of both requests 904 and 908, the aggregator 132 may receive, for example, a booking reference and an e-ticket number, each of which can be stored in the aggregated data object 560 (e.g. according to the relevant data object definition).

As will be apparent to those skilled in the art from the examples illustrated in FIGS. 8 and 9, the use of a single aggregated update operation by the client subsystem 120 (which is used by the aggregator 132 to initiate distinct, and in some cases multi-stage, update mechanisms with the relevant supplier subsystems 104) can reduce the volume of communications between the client subsystem 120 and the aggregator 132. In addition, this arrangement simplifies the deployment of client subsystems 120 and the integration of new supplier subsystems 104, as noted earlier.

As will further be apparent to those skilled in the art from the explanations set forth above, storing the aggregated data objects at the aggregator 132, for example in the repository 140, provides various technical advantages over other systems. Such systems may only act as intermediating data exchange and delivery platforms, without any storage capability of aggregated data made available to client subsystems. For example, storing the aggregated data objects facilitates performance of client operations such as read and update as at least a part of the operations (such as a read operation of aggregated data objects already stored in the repository 140) can be performed locally at the aggregator 132 independent from a performance of the interfaces to the supplier subsystems 104 and the supplier-specific operations.

Moreover, storing the aggregated data objects at the aggregator 132 allows for a client-specific storage, i.e. the aggregated data objects stored at the aggregator 132 are owned by the client subsystem 120 which read and/or updated the aggregated data objects in the first place. This promotes security and data privacy of the aggregated data objects stored at aggregator 132 as e.g. only the owning client subsystem 120 has, at least initially, the access rights to apply operations such as read and update on these aggregated data objects. The client subsystem 120 may then be given the possibility, via further access-right-related management operations provided by the API, to share one or more of its stored aggregated data objects with other client subsystems and/or further entities external of the system 100. For example, the owning client system 120 could allow read access to an aggregated data object stored at the aggregator 132 to another client system. Enhanced access and security management of aggregated data objects thus becomes possible.

As also mentioned earlier, the systems and methods discussed above may be applied to a wide variety of data objects beyond the travel-related data objects discussed in the examples above. That is, the systems and methods discussed herein can reduce deployment complexity and communications load when retrieving and updating data, independent of the nature of the data being updated.

Those skilled in the art will appreciate that in some embodiments, the functionality of the application 212 at the aggregator 132 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of aggregating and updating heterogeneous data objects for a client subsystem, the method comprising:
   storing a set of data object definitions, each data object definition providing a mapping between an aggregated data object format and a plurality of supplier data object formats;
   storing a set of update definitions, each update definition providing a mapping between an aggregated update operation and a plurality of supplier update mechanisms;
   receiving a data object in one of the supplier data object formats;
   selecting, based on the supplier data object format of the received data object, one of the data object definitions and generating an aggregated data object according to the selected data object definition;
   storing the aggregated data object in an aggregated data record in a repository;
   presenting the generated aggregated data object to the client subsystem;
   receiving an aggregated update operation from the client subsystem for updating the aggregated data object;
   updating the aggregated data object stored in the aggregated data record in the repository in accordance with the aggregated update operation; and
   selecting, based on the received aggregated update operation, one of the update definitions and initiating a supplier update mechanism according to the selected update definition.

2. The method of claim 1, wherein each supplier data object format corresponds to (i) a distribution channel indicator and (ii) a data object type.

3. The method of claim 2, wherein the aggregated data object format includes a supplier identifier field; the method further comprising storing a plurality of supplier identifiers and corresponding distribution channel indicators.

4. The method of claim 1, further comprising:
   repeating the receiving, selecting and generating for a further aggregated data object; and
   storing the aggregated data object and the further aggregated data object in the aggregated data record in the repository prior to the presenting.

5. The method of claim 1, wherein the aggregated data object format includes (i) a supplier portion mapped by the corresponding data object definition to the plurality of supplier data object formats, and (ii) a client portion that is not mapped by the corresponding data object definition.

6. The method of claim 1, wherein each supplier update mechanism corresponds to (i) a distribution channel indicator and (ii) a data object type.

7. The method of claim 1, wherein at least one supplier update mechanism includes a sequence of update operations mapped to the aggregated update operation.

8. The method of claim 1, wherein initiating the supplier update mechanism comprises:
   based on the data object definition corresponding to the aggregated data object, generating update payload data in the supplier data object format; and
   transmitting the update payload data according to the supplier update mechanism.

9. The method of claim 1, wherein the data objects define travel items.

10. The method of claim 1, wherein at least one of the update definitions corresponds to a message sequence based on the New Distribution Capability (NDC) standard.

11. An aggregator server, comprising:
   a memory storing:
      a set of data object definitions, each data object definition providing a mapping between an aggregated data object format and a plurality of supplier data object formats; and
      a set of update definitions, each update definition providing a mapping between an aggregated update operation and a plurality of supplier update mechanisms;
   a processor interconnected with the memory, the processor configured to:
      receive a data object in one of the supplier data object formats;
      select, based on the supplier data object format of the received data object, one of the data object definitions and generate an aggregated data object according to the selected data object definition;
      store the aggregated data object in an aggregated data record in a repository;
      present the generated aggregated data object to the client subsystem;
      receive an aggregated update operation from the client subsystem for updating the aggregated data object;
      update the aggregated data object stored in the aggregated data record in the repository in accordance with the aggregated update operation; and
      select, based on the received aggregated update operation, one of the update definitions and initiate a supplier update mechanism according to the selected update definition.

12. The aggregator server of claim 11, wherein each supplier data object format corresponds to (i) a distribution channel indicator and (ii) a data object type.

13. The aggregator server of claim 12, wherein the aggregated data object format includes a supplier identifier field; the memory storing a plurality of supplier identifiers and corresponding distribution channel indicators.

14. The aggregator server of claim 11, the processor further configured to:
   repeat the receipt, selection and generation for a further aggregated data object; and
   store the aggregated data object and the further aggregated data object in the aggregated data record in the repository.

15. The aggregator server of claim 11, wherein the aggregated data object format includes (i) a supplier portion mapped by the corresponding data object definition to the plurality of supplier data object formats, and (ii) a client portion that is not mapped by the corresponding data object definition.

16. The aggregator server of claim 11, wherein each supplier update mechanism corresponds to (i) a distribution channel indicator and (ii) a data object type.

17. The aggregator server of claim 11, wherein at least one supplier update mechanism includes a sequence of update operations mapped to the aggregated update operation.

18. The aggregator server of claim 11, wherein the processor is configured, to initiate the supplier update mechanism, to:
- based on the data object definition corresponding to the aggregated data object, generate update payload data in the supplier data object format; and
- transmit the update payload data according to the supplier update mechanism.

19. The aggregator server of claim 11, wherein the data objects define travel items.

20. The aggregator server of claim 11, wherein at least one of the update definitions corresponds to a message sequence based on the New Distribution Capability (NDC) standard.

21. A computer program product comprising program instructions stored on a non-transitory computer readable medium, the program instructions executable by a processor to:
- store (i) a set of data object definitions, each data object definition providing a mapping between an aggregated data object format and a plurality of supplier data object formats, and (ii) a set of update definitions, each update definition providing a mapping between an aggregated update operation and a plurality of supplier update mechanisms;
- receive a data object in one of the supplier data object formats;
- select, based on the supplier data object format of the received data object, one of the data object definitions and generate an aggregated data object according to the selected data object definition;
- store the aggregated data object in an aggregated data record in a repository;
- present the generated aggregated data object to the client subsystem;
- receive an aggregated update operation from the client subsystem for updating the aggregated data object;
- update the aggregated data object stored in the aggregated data record in the repository in accordance with the aggregated update operation; and
- select, based on the received aggregated update operation, one of the update definitions and initiate a supplier update mechanism according to the selected update definition.

\* \* \* \* \*